US010458253B2

(12) United States Patent
Mongillo, Jr.

(10) Patent No.: US 10,458,253 B2
(45) Date of Patent: Oct. 29, 2019

(54) GAS TURBINE ENGINE COMPONENTS HAVING INTERNAL HYBRID COOLING CAVITIES

(71) Applicant: United Technologies Corporation, Farmington, CT (US)

(72) Inventor: Dominic J. Mongillo, Jr., West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/864,456

(22) Filed: Jan. 8, 2018

(65) Prior Publication Data

US 2019/0211692 A1    Jul. 11, 2019

(51) Int. Cl.
    *F01D 5/18*    (2006.01)

(52) U.S. Cl.
    CPC .......... *F01D 5/187* (2013.01); *F05D 2220/32* (2013.01); *F05D 2240/35* (2013.01); *F05D 2250/50* (2013.01); *F05D 2250/71* (2013.01); *F05D 2260/202* (2013.01); *F05D 2260/2212* (2013.01); *F05D 2260/22141* (2013.01)

(58) Field of Classification Search
    CPC .................................. F01D 5/186; F01D 5/187
    See application file for complete search history.

(56) References Cited

U.S. PATENT DOCUMENTS

| 4,257,737 A * | 3/1981 | Andress | F01D 5/187 415/115 |
| 4,820,122 A * | 4/1989 | Hall | F01D 5/187 416/92 |
| 5,816,777 A * | 10/1998 | Hall | F01D 5/189 416/97 R |
| 6,234,753 B1 * | 5/2001 | Lee | F01D 5/187 415/115 |

(Continued)

FOREIGN PATENT DOCUMENTS

| EP | 3091186 A1 | 11/2016 |
| EP | 3495615 A1 | 6/2019 |

(Continued)

OTHER PUBLICATIONS

European Search Report for European Application No. 19150838.1, International Filing Date Jan. 8, 2019, dated Jul. 16, 2019, 9 pages.

*Primary Examiner* — Woody A Lee, Jr.
(74) *Attorney, Agent, or Firm* — Cantor Colburn LLP

(57) ABSTRACT

Components for gas turbine engines are provided. The components include a hybrid skin core cooling cavity defined by a cold wall and a hot wall, wherein the hot wall is exposed to an exterior environment of the component and a resupply hole is formed in the cold wall and fluidly connects a cold core cavity and the cooling cavity. The resupply hole extends between an inlet on a side of the cold wall exposed to the cold core cavity and an outlet on a side of the cold wall exposed to the cooling cavity. The cavity resupply hole is angled relative to the cold wall at an injection angle such that air passing through the cavity (Continued)

resupply hole is injected into the cooling cavity at the injection angle and at least partially parallel to a direction of flow within the hybrid skin core cooling cavity.

18 Claims, 8 Drawing Sheets

(56) References Cited

U.S. PATENT DOCUMENTS

| | | | |
|---|---|---|---|
| 8,439,628 B2 | 5/2013 | Maldonado | |
| 8,591,190 B2 * | 11/2013 | Tibbott | F01D 5/187 |
| | | | 416/97 R |
| 8,870,537 B2 | 10/2014 | Lee | |
| 8,882,448 B2 | 11/2014 | Lee | |
| 8,894,367 B2 | 11/2014 | Lee et al. | |
| 8,944,141 B2 | 2/2015 | Propheter-Hinckley et al. | |
| 8,985,949 B2 | 3/2015 | Lee et al. | |
| 2017/0101932 A1 | 4/2017 | Stover et al. | |
| 2017/0211396 A1 | 7/2017 | Mongillo et al. | |
| 2018/0156042 A1 * | 6/2018 | Mongillo, Jr. | F01D 5/187 |
| 2019/0048728 A1 * | 2/2019 | Clum | F01D 5/187 |
| 2019/0101005 A1 * | 4/2019 | Clum | F01D 5/186 |
| 2019/0169993 A1 * | 6/2019 | Whitfield | F01D 5/187 |

FOREIGN PATENT DOCUMENTS

| | | |
|---|---|---|
| WO | 2014052277 A1 | 4/2014 |
| WO | 2015006026 A1 | 1/2015 |
| WO | 2017105379 A1 | 6/2017 |

* cited by examiner

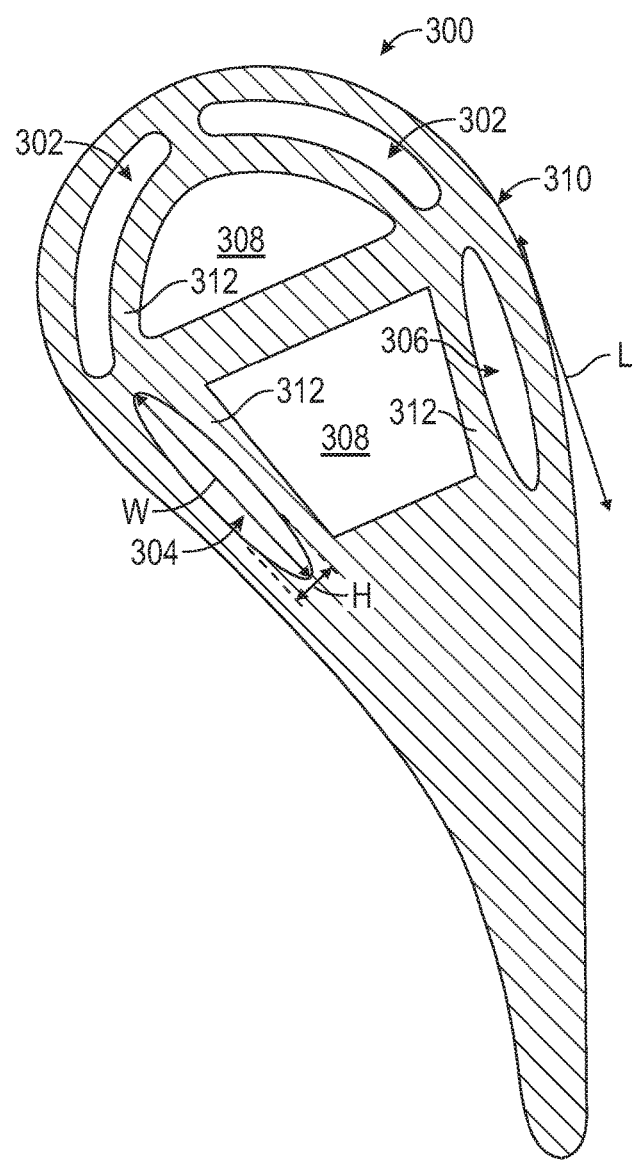
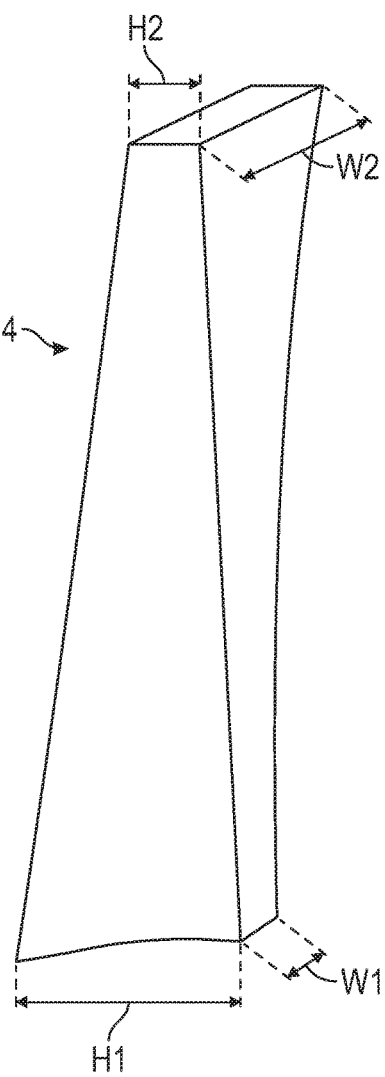
FIG. 3A
FIG. 3B

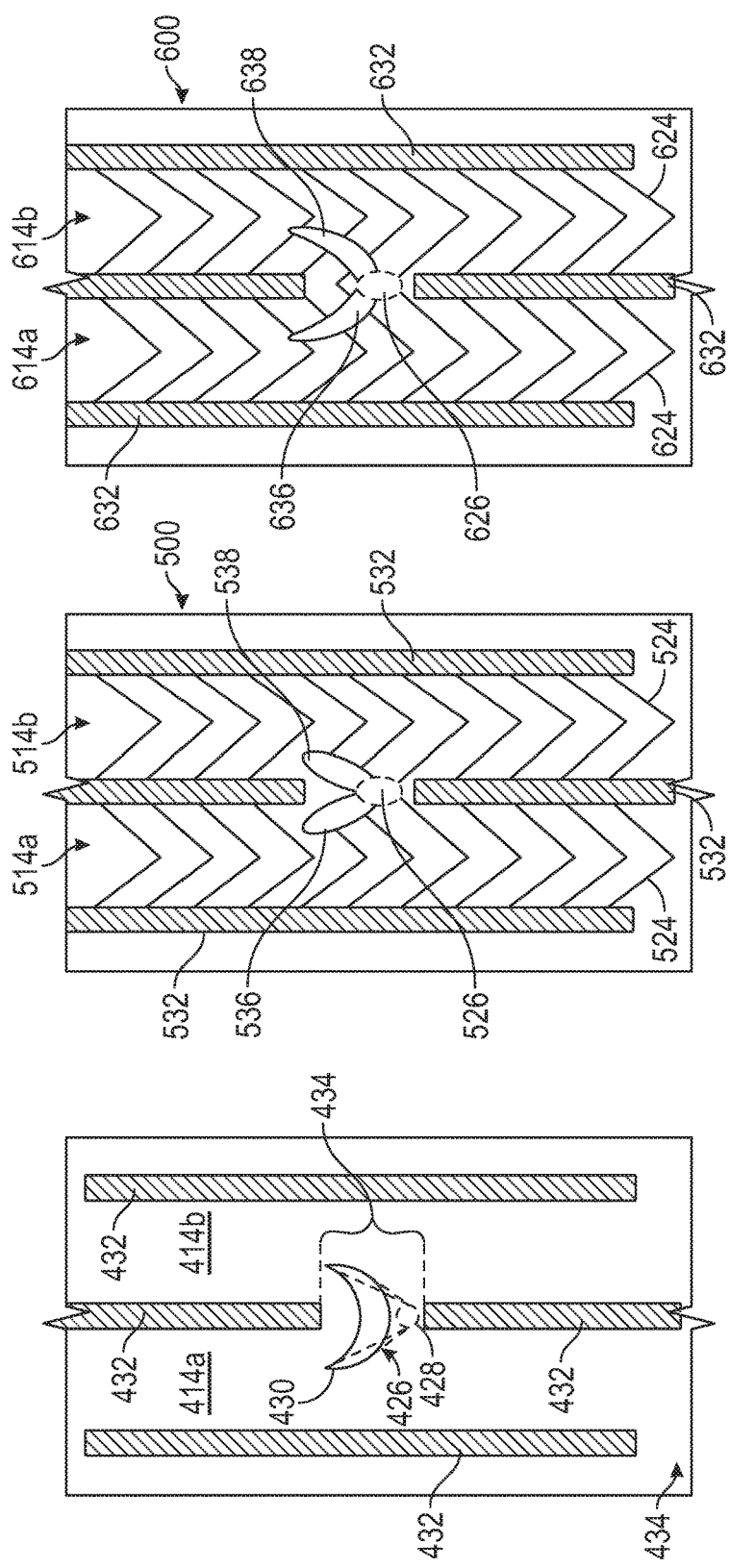

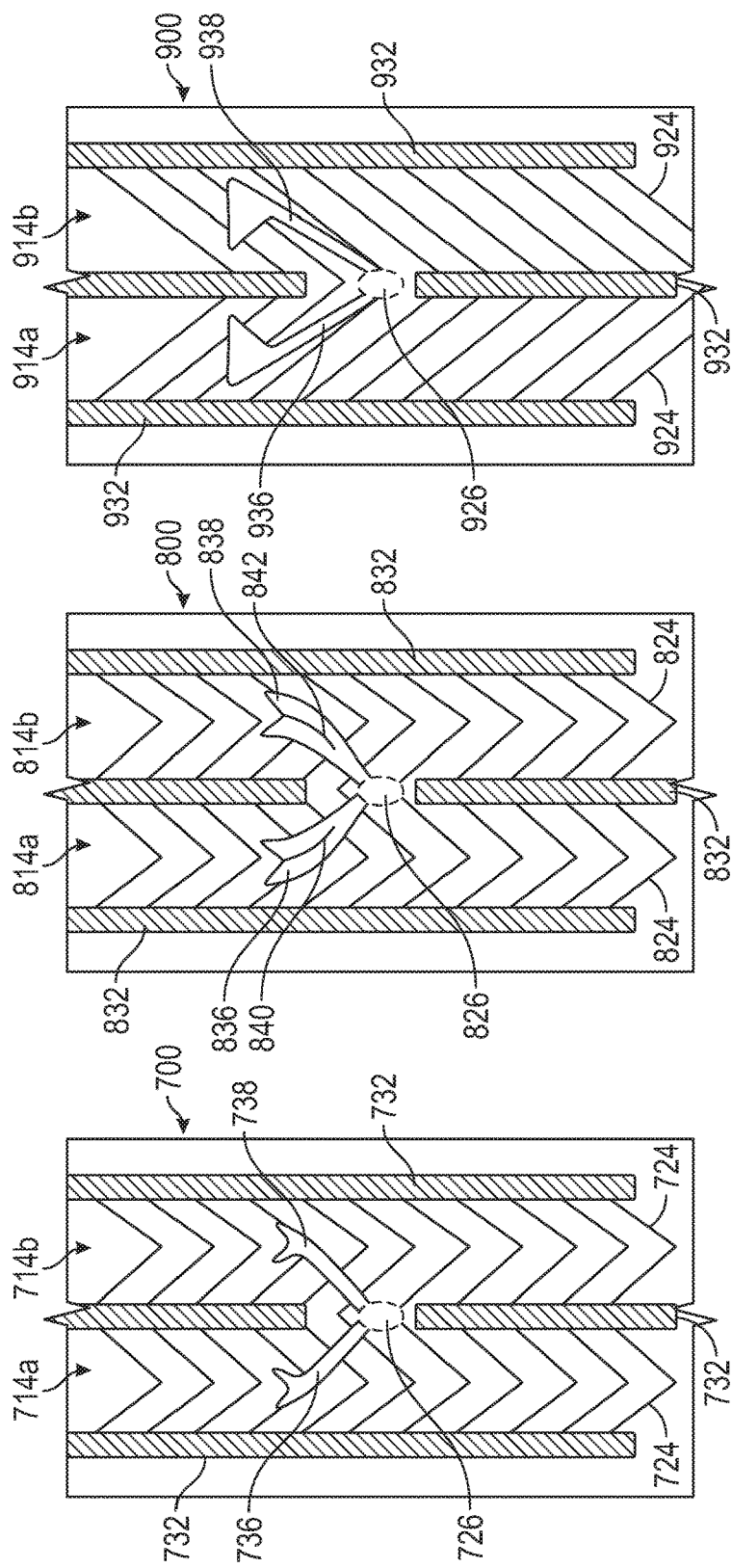

GAS TURBINE ENGINE COMPONENTS HAVING INTERNAL HYBRID COOLING CAVITIES

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of the airfoil bodies and exterior hot walls, various cooling flow characteristics can cause hot sections where cooling may not sufficiently provide adequate backside convective cooling attributed to limited cooling flow allocations, resulting in low cavity Reynolds numbers and excessive cooling air heat pickup. This may result in reduced local thermal cooling effectiveness. Accordingly, improved means for providing more effective cooling within an airfoil may be desirable in order to meet durability life requirements.

BRIEF DESCRIPTION

According to some embodiments, component for gas turbine engines are provided. The components include a hybrid skin core cooling cavity defined by a cold wall and a hot wall, wherein the hot wall is exposed to an exterior environment of the component and a hybrid skin core cooling cavity resupply hole formed in the cold wall and fluidly connecting a cold core cavity and the hybrid skin core cooling cavity. The hybrid skin core cooling cavity resupply hole extends between an inlet on a side of the cold wall exposed to the cold core cavity and an outlet on a side of the cold wall exposed to the hybrid skin core cooling cavity. The hybrid skin core cooling cavity resupply hole is angled relative to the cold wall at an injection angle such that air passing through the hybrid skin core cooling cavity resupply hole is injected into the hybrid skin core cooling cavity at the injection angle and at least partially parallel to a direction of flow within the hybrid skin core cooling cavity.

In addition to one or more of the features described herein, or as an alternative, further embodiments of the components may include that the hot wall is an exterior wall of an airfoil and the cold wall is an interior wall of the airfoil.

In addition to one or more of the features described herein, or as an alternative, further embodiments of the components may include that the outlet of the hybrid skin core cooling cavity resupply hole has a geometric shape that is different from the inlet.

In addition to one or more of the features described herein, or as an alternative, further embodiments of the components may include that a cross-sectional area of the hybrid skin core cooling cavity resupply hole increases from the inlet to the outlet.

In addition to one or more of the features described herein, or as an alternative, further embodiments of the components may include a segmented rib within the hybrid skin core cooling cavity, wherein a gap is formed between segments of the segmented rib.

In addition to one or more of the features described herein, or as an alternative, further embodiments of the components may include that at least one of the inlet and the outlet are positioned within the gap between two segments of the segmented rib.

In addition to one or more of the features described herein, or as an alternative, further embodiments of the components may include that the segmented rib divides the hybrid skin core cooling cavity into a first subcavity and a second subcavity.

In addition to one or more of the features described herein, or as an alternative, further embodiments of the components may include that the outlet of the hybrid skin core cooling cavity resupply hole is arranged to supply resupply air into both the first subcavity and the second subcavity.

In addition to one or more of the features described herein, or as an alternative, further embodiments of the components may include that the outlet has at least one of a crescent, a curved, and a cusped shape.

In addition to one or more of the features described herein, or as an alternative, further embodiments of the components may include that the hybrid skin core cooling cavity resupply hole is a multi-lobed hybrid skin core cooling cavity resupply hole.

In addition to one or more of the features described herein, or as an alternative, further embodiments of the components may include that the multi-lobed hybrid skin core cooling cavity resupply hole comprises a first resupply branch and a second resupply branch, wherein each of the first resupply branch and the second resupply branch are fluidly connected to the inlet and have separate openings at the outlet.

In addition to one or more of the features described herein, or as an alternative, further embodiments of the components may include that at least one lobe of the multi-lobed hybrid skin core cooling cavity resupply hole comprises an internal divider proximate the outlet.

In addition to one or more of the features described herein, or as an alternative, further embodiments of the components may include that the outlet of the hybrid skin core cooling cavity resupply hole is streamwise diffuser-shaped.

In addition to one or more of the features described herein, or as an alternative, further embodiments of the components may include that the hybrid skin core cooling cavity includes a plurality of heat transfer augmentation features.

In addition to one or more of the features described herein, or as an alternative, further embodiments of the components may include that the plurality of heat transfer augmentation features are formed on the hot wall of the hybrid skin core cooling cavity.

In addition to one or more of the features described herein, or as an alternative, further embodiments of the components may include that the outlet of the hybrid skin core cooling cavity resupply hole is shaped to align with a shape of the heat transfer augmentation features.

In addition to one or more of the features described herein, or as an alternative, further embodiments of the components may include that the injection angle is 30° or less.

According to some embodiments, gas turbine engines are provided. The gas turbine engines include a component having a hybrid skin core cooling cavity defined by a cold wall and a hot wall, wherein the hot wall is exposed to an exterior environment of the component and a hybrid skin core cooling cavity resupply hole formed in the cold wall and fluidly connecting a cold core cavity and the hybrid skin core cooling cavity. The hybrid skin core cooling cavity resupply hole extends between an inlet on a side of the cold wall exposed to the cold core cavity and an outlet on a side of the cold wall exposed to the hybrid skin core cooling cavity. The hybrid skin core cooling cavity resupply hole is angled relative to the cold wall at an injection angle such that air passing through the hybrid skin core cooling cavity resupply hole is injected into the hybrid skin core cooling cavity at the injection angle and at least partially parallel to a direction of flow within the hybrid skin core cooling cavity.

In addition to one or more of the features described herein, or as an alternative, further embodiments of the gas turbine engines may include that the component is one of a blade, a vane, a blade outer air seal, or a combustor panel.

In addition to one or more of the features described herein, or as an alternative, further embodiments of the gas turbine engines may include that the hot wall is an exterior wall of an airfoil, the cold wall is an interior wall of the airfoil, and the exterior environment is a gas path of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

FIG. 3A is a schematic illustration of a hybrid skin core cooling cavity configuration of an airfoil;

FIG. 3B is a schematic view of a hybrid skin core cooling cavity of the airfoil of FIG. 3A, with a varying height and width along its length;

FIG. 4C is a cross-sectional illustration of the airfoil of FIG. 4A as viewed along the line C-C shown in FIG. 4A;

FIG. 5 is a schematic illustration of a hybrid skin core cooling cavity resupply hole geometry in accordance with an embodiment of the present disclosure;

FIG. 6 is a schematic illustration of a hybrid skin core cooling cavity resupply hole geometry in accordance with an embodiment of the present disclosure;

FIG. 7 is a schematic illustration of a hybrid skin core cooling cavity resupply hole geometry in accordance with an embodiment of the present disclosure;

FIG. 8 is a schematic illustration of a hybrid skin core cooling cavity resupply hole geometry in accordance with an embodiment of the present disclosure;

FIG. 9 is a schematic illustration of a hybrid skin core cooling cavity resupply hole geometry in accordance with an embodiment of the present disclosure;

DETAILED DESCRIPTION

Detailed descriptions of one or more embodiments of the disclosed apparatus and/or methods are presented herein by way of exemplification and not limitation with reference to the Figures.

Figure 1:
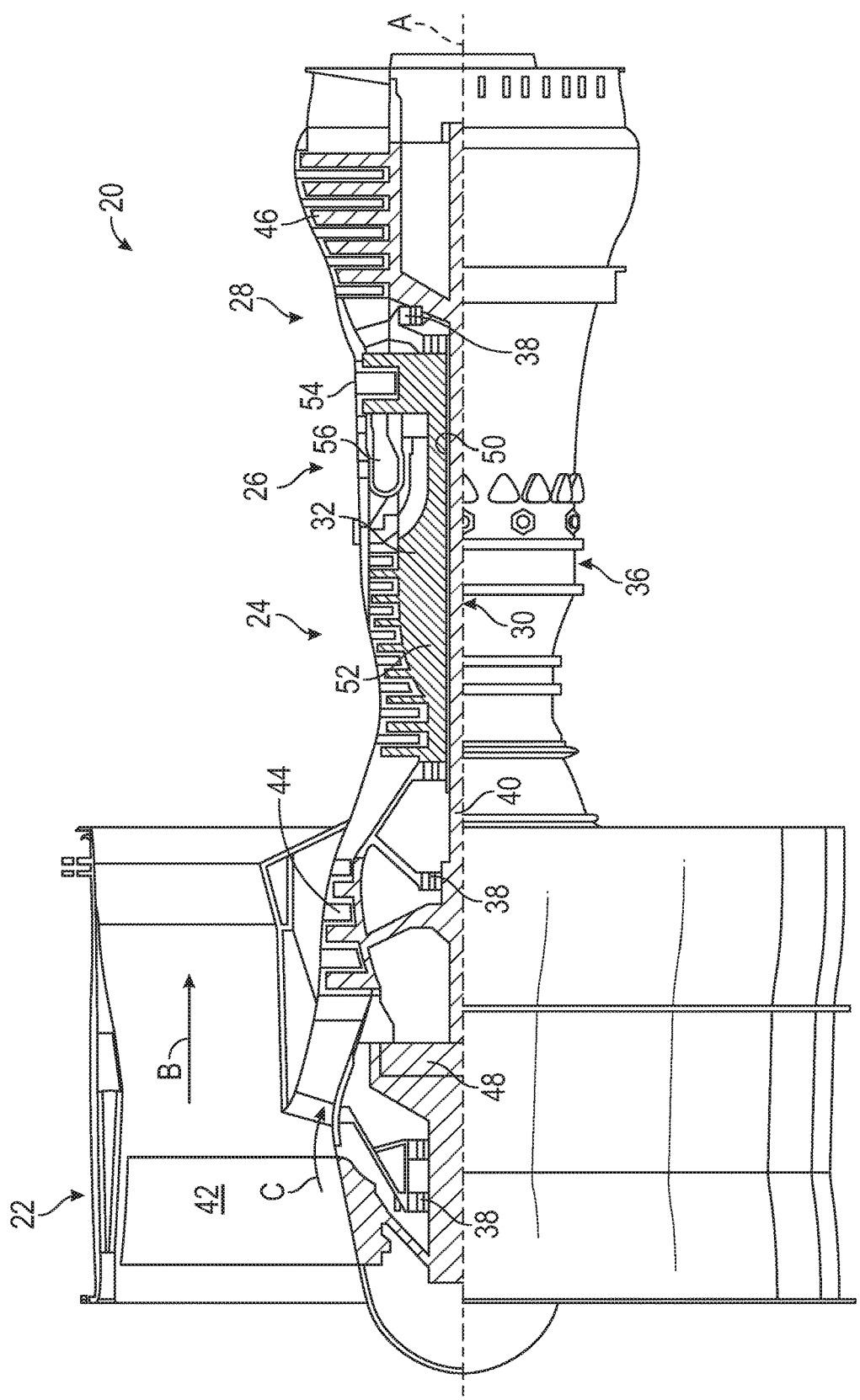
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
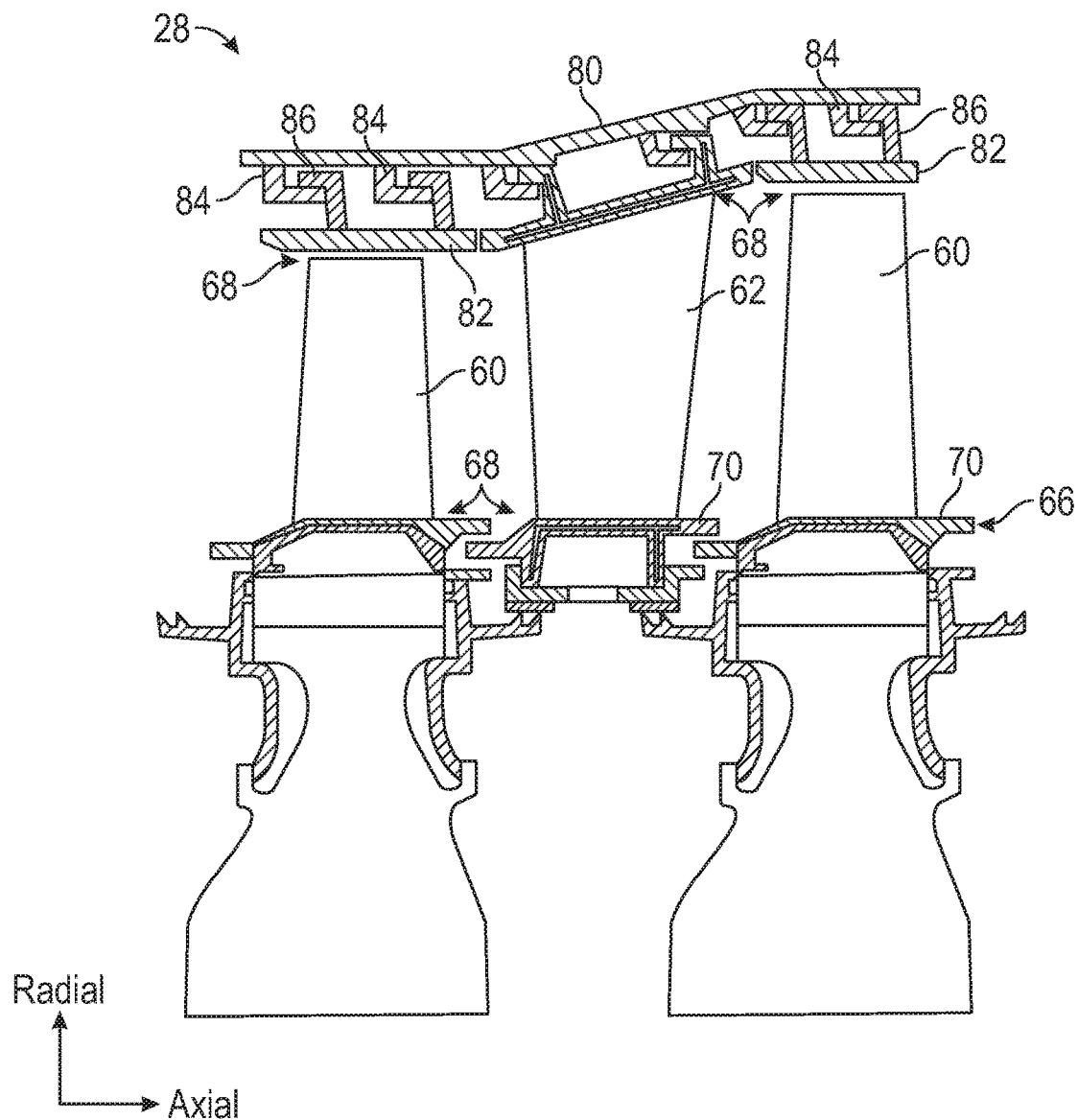
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending between an inner diameter 66 and an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

As shown and labeled in FIG. 2, a radial direction is upward on the page (e.g., radial with respect to an engine axis) and an axial direction is to the right on the page (e.g., along an engine axis). Thus, radial cooling flows will travel up or down on the page and axial flows will travel left-to-right (or vice versa).

In a double-wall airfoil (e.g., blade) configuration, thin (i.e., low aspect ratio) hybrid skin core cavity passages are arranged to extend radially through the airfoil. The hybrid skin core cavity passages are provided in a thickness direction between the core cooling passages and each of the pressure and suction side exterior airfoil surfaces. Double-wall cooling has been used as a technology to improve the cooling effectiveness of various gas turbine engine components, including, but not limited to, turbine blades, vanes, blade out air seals, combustor panels, and other hot section components. Often, core support features are used to resupply air from a main body core, which creates the core passages, into the hybrid skin core cavity passages, which creates the skin passages.

With traditional double-wall configurations, a cooling benefit is derived from passing coolant air from the internal radial flow and/or serpentine cavities through the "cold" wall via impingement (resupply) holes and impinging the flow on the "hot" wall. These core support (resupply)

features are typically oriented perpendicular to the direction of flow in the hybrid skin core cooling cavities. These perpendicular core supports (resupply) features induce local flow vortices which can generate a significant amount of turbulent mixing to occur locally within the hybrid skin core cavity passage.

Although the impingement flow field characteristics associated with the resupply holes may appear beneficial, such holes can also create local flow characteristics which are not advantageous from an internal cooling perspective. Adverse impacts due to disruptive impingement resupply features oriented perpendicular to the streamwise flow direction within the hybrid skin core cavity generate pressure and momentum mixing losses that may mitigate favorable convective cooling flow field characteristics. Potential improvements in the internal flow field cooling qualities are diminished due to the disruptive nature of the injection of high pressure and high velocity resupply cooling air flow normal to a main hybrid skin core cooling passage flow direction. The potential decrease in bulk fluid cooling temperature may be adversely impacted by additional cooling air heat pickup incurred due to high impingement heat transfer and subsequent heat removal from an exterior hot wall. In a purely convective hybrid skin core cooling channel passage, the locally high impingement heat transfer generated by the resupply features oriented normal to the downstream cooling flow may produce large local metal temperature gradients that result in locally high thermal strain and subsequent thermal mechanical fatigue crack initiation and propagation failure mechanisms.

Improving the mixing characteristics of the different flows through the incorporation of "in-line" or "angled" resupply orientation and unique geometric features can improve the overall convective cooling characteristics of the internal flow field and increase the thermal cooling effectiveness of resupplied hybrid skin core cooling cavity passages. In accordance with some embodiments of the present disclosure, improvements in the relative alignment of the resupply cooling flow with the downstream cooling flow within the hybrid skin core cooling channel passages is achieved. Further, in accordance with some embodiments of the present disclosure, the introduction of a resupply cooling flow at a mass and momentum flux ratio that is greater than the mass and momentum flux of the downstream cooling flow within the hybrid skin core cooling channel passage immediately adjacent to the internal surface of the hot exterior airfoil wall can be achieved. By introducing resupply flow through a diffused geometric feature (e.g., a geometric resupply hole), the relative mass and momentum mixing of the different flow streams can be more easily controlled by modifying the expansion ratio of the diffusing section of the resupply geometry.

Turning now to FIGS. 3A-3B, schematic illustrations of an airfoil 300 having hybrid skin core cooling cavities located around the periphery of the airfoil 300 immediately adjacent to the hot exterior wall surfaces are shown. In some embodiments, it is desirable to locate the hybrid skin core cooling cavities in airfoil locations where the external heat flux is the highest in order to mitigate local excessive metal temperatures observed during engine operation. As a result of the high local external heat flux, there may be a significant amount of cooling air temperature rise that occurs due to the high internal heat transfer that is achievable with hybrid skin core cooling cavities. The increased thermal efficiency associated with the hybrid skin core cavities facilitates the convection of heat from the hot exterior wall to the working fluid. It is desirable to mitigate cooling air temperature rise and enhance the local internal convective heat transfer which achieves a maximum augmentation level as a function of the ratio of the development length, L, and the hydraulic diameter, $D_h$, of the hybrid skin core cooling passage. As the internal flow becomes fully developed, the relative internal heat transfer augmentation begins to decay monotonically as a function of $L/D_h$ for the remainder of the hybrid skin core cooling passage, thereby reducing the local thermal cooling effectiveness. Both of these phenomena can adversely impact the local thermal performance of the hybrid skin core cooling passages. However these effects can be mitigated through the incorporation of periodic boundary layer restart resupply features within the hybrid skin core cooling cavities, as described herein.

As used herein, a "hybrid skin core cooling cavity" is an internal cavity of an airfoil that has one wall that is a hot wall (e.g., exterior surface of an airfoil body and exposed to hot, gaspath air, (i.e., an exterior wall exposed to an exterior environment)) and another wall that is a cold wall (e.g., a wall that is not exposed to the hot gaspath air, and may be an internal or interior wall structure of the airfoil). For example, as shown in FIG. 3A, the airfoil 300 has two leading edge hybrid skin core cooling cavities 302, a pressure side hybrid skin core cooling cavity 304, and a suction side hybrid skin core cooling cavity 306. The hybrid skin core cooling cavities 302, 304, 306, in the present configurations, are arranged around internal cold core cavities 308 of the airfoil 300.

The hybrid skin core cooling cavities 302, 304, 306 are defined in the airfoil 300 with a first wall of the hybrid skin core cooling cavity defined by an exterior surface wall 310 of the airfoil 300. The exterior surface wall 310 is a "hot" wall of the airfoil 300 that is exposed to hot, gaspath air. A second wall of the hybrid skin core cooling cavity is defined by an interior wall 312, with the interior wall 312 being a "cold" wall of the airfoil 300. A "cold" wall is one that is not exposed to the hot gaspath air, and thus remains relatively cool in comparison to the hot, exterior surface walls. In this illustration, the interior walls 312 are defining walls of the internal, cold core cavities 308. In some arrangements, cooling air can be passed from the cold core cavity 308 into an adjacent hybrid skin core cooling cavity 302, 304, 306.

Embodiments described herein are directed to providing double-wall cooling designs, wherein a portion of the cold air within a cold core cavity is directed into a hybrid skin core cooling cavity. In accordance with embodiments of the present disclosure, the utilization of advanced double-wall cooling design configurations that incorporate hybrid skin core cooling channel cavities adjacent to the external airfoil surfaces are used to mitigate cooling flow requirements for high heat load applications in order to achieve performance and durability life requirements. As a result of the relatively small cavity flow area associated with hybrid skin core cooling cavities (e.g., "micro" channel) and a relative high flow per unit area, the resulting internal convective heat transfer is significantly increased.

The hybrid skin core cooling cavities of the present disclosure may have low hydraulic diameters. For example, with reference to FIG. 3A, the hybrid skin core cooling cavity 304 is shown having a width W that is a distance along the hot or cold wall of the hybrid skin core cooling cavity 304 (e.g., axial or chord-wise direction relative to the airfoil 300) and a height H that is a distance or length between the hot wall and the cold wall of the hybrid skin core cooling cavity 304 (e.g., circumferential direction with respect to the airfoil), where the aspect ratio of a cooling channel passage is defined as the ratio of the height H to the width W (H/W).

As shown in FIG. 3B, a schematic view of a hybrid skin core cooling cavity 314 with a varying height and width along its length is shown. The hybrid skin core cooling cavity 314 may be representative of one or more of the hybrid skin core cooling cavities shown in FIG. 3A. A variation in hybrid skin core cooling cavity aspect ratio is schematically shown. The height H and/or width W can be varied along the length (i.e., H1≠H2 and/or W1≠W2 in the radial span-wise and chord-wise directions). However, some of the hybrid skin core cooling cavities of the airfoil 300 may be uniform in dimension, and thus the present illustrations and description are merely for illustrative and explanatory purposes, and no limitation is intended.

The hybrid skin core cavities in accordance with embodiments of the present disclosure have relatively low cavity aspect ratios H/W and/or variable aspect ratios along the airfoil span from the inner diameter to the outer diameter (e.g., root to tip). In some embodiments, a hybrid skin core cavity, or portion thereof, may have a height-to-width ratio H/W of less than about 0.8, while conventional cooling passage cavities that extend from the pressure side airfoil surface to suction side airfoil surface have a height-to-width ratio H/W greater than about 0.8. In some embodiments, the hybrid skin core cavities 302, 304, 306 of the airfoil 300 can have a height-to-width H/W ratio of 0.8 or less along at least a portion of a radial length of the hybrid skin core cavity cooling passage. As noted above, as used with respect to the described cavity height-to-width ratio, a "height" of a cavity is a distance from a surface on an outer wall of the airfoil that partially defines the cavity to a surface of an inner wall that is internal to the airfoil (e.g., as shown in FIG. 3A, a distance between a hot wall 310 and a cold wall 312 that define the hybrid skin core cavities 302, 304, 306). Further, a width of a cavity, as used herein, is an arc length of the cold wall 312.

As shown in FIG. 3A, the hybrid skin core cavity cooling passages 304, 306 may be provided in the airfoil pressure and suction walls, which separate the respective airfoil walls into the hot side wall 310 and the cold side wall 312. The hybrid skin core cavity cooling passages 302, 303, 304 typically have a much lower aspect ratio H/W than the "central main-body core" passages 308. Typically, hybrid skin core cavity cooling passages have a cavity height H to cavity width W ratio H/W that may vary in cavity aspect ratio between 3:1≥H/W≥1:5. The height of the hybrid skin core cavities 304, 306 are generally in the thickness direction and typically normal to a tangent line L at the exterior airfoil hot surface 310, and is in a range of 0.010-0.200 inches (0.25-5.08 mm). In some situations, the length to hydraulic diameter $L/D_h$ of the hybrid skin core cooling cavities can be excessively high $L/D_h>15$. Such hybrid skin core cooling cavities may be referred to herein as "micro" channels or "hybrid micro cooling channel cavities."

In convectively cooled hybrid micro cooling channel cavities the internal cooling flow has a development flow length, $L/D_h$, in which the internal convective heat transfer increases to a maximum augmentation level. Once the internal cooling flow in the micro cooling channel cavity is fully developed the internal convective heat transfer augmentation begins to decrease monotonically as a function of $L/D_h$ for the remainder of the hybrid skin core cooling micro channel length. As a result of the high internal convective heat transfer within the hybrid micro cooling channel there may be a significant amount of frictional pressure loss and cooling air temperature heat pickup that occurs. Both of these effects adversely can impact the local thermal cooling capacity of the hybrid micro cooling channels.

In order to mitigate excessive pressure loss and cooling air temperature heat pickup, it may be desirable to alleviate the internal flow characteristics that adversely impact the local convective cooling effectiveness that occurs in a long $L/D_h$ hybrid micro cooling channel cavity. In accordance with embodiments provided herein, means for mitigating reductions in convective heat transfer augmentation resulting from fully developed flow, excessive pressure loss, and cooling air temperature heat pickup in high $L/D_h$ hybrid micro cooling channels include the incorporation of boundary layer restart resupply features or low momentum mixing resupply features, hereinafter "hybrid skin core cooling cavity resupply holes."

The hybrid skin core cooling cavity resupply holes are geometric resupply holes that fluidly connect a cold "central main-body" core cavity with a hybrid skin core cooling cavity. In some embodiments, the hybrid skin core cooling cavity resupply holes may be formed such that air passing through the hybrid skin core cooling cavity resupply holes exits normal to the cold wall and may impinge upon the hot wall. Such arrangement may be limited by a method of manufacture. In some embodiments, the hybrid skin core cooling cavity resupply holes may be angled relative to the cold wall and may be manufactured using additive manufacturing and/or fugitive core techniques. In some embodiments, the hybrid skin core cooling cavity resupply holes can be located between radially extending segmented rib features located within a hybrid skin core cooling cavity and/or segregating two adjacent hybrid skin core cooling cavities. In some embodiments, the hybrid skin core cooling cavity resupply holes can be formed within a cold wall of a single hybrid skin core cooling cavity.

Figure 4A:
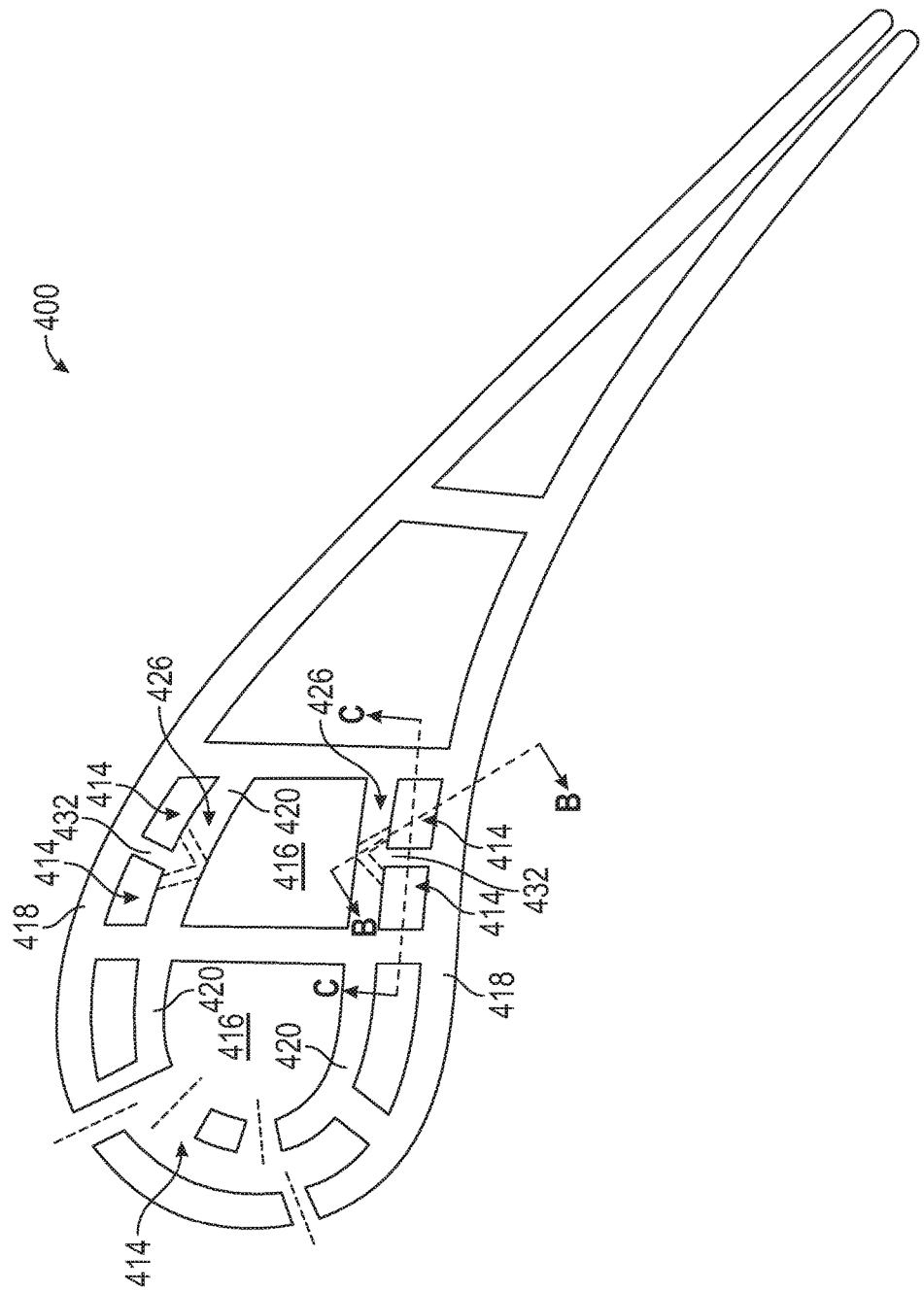
FIG. 4A is a schematic illustration of an airfoil having a hybrid skin core cooling cavity configuration in accordance with an embodiment of the present disclosure.
Figure 4B:
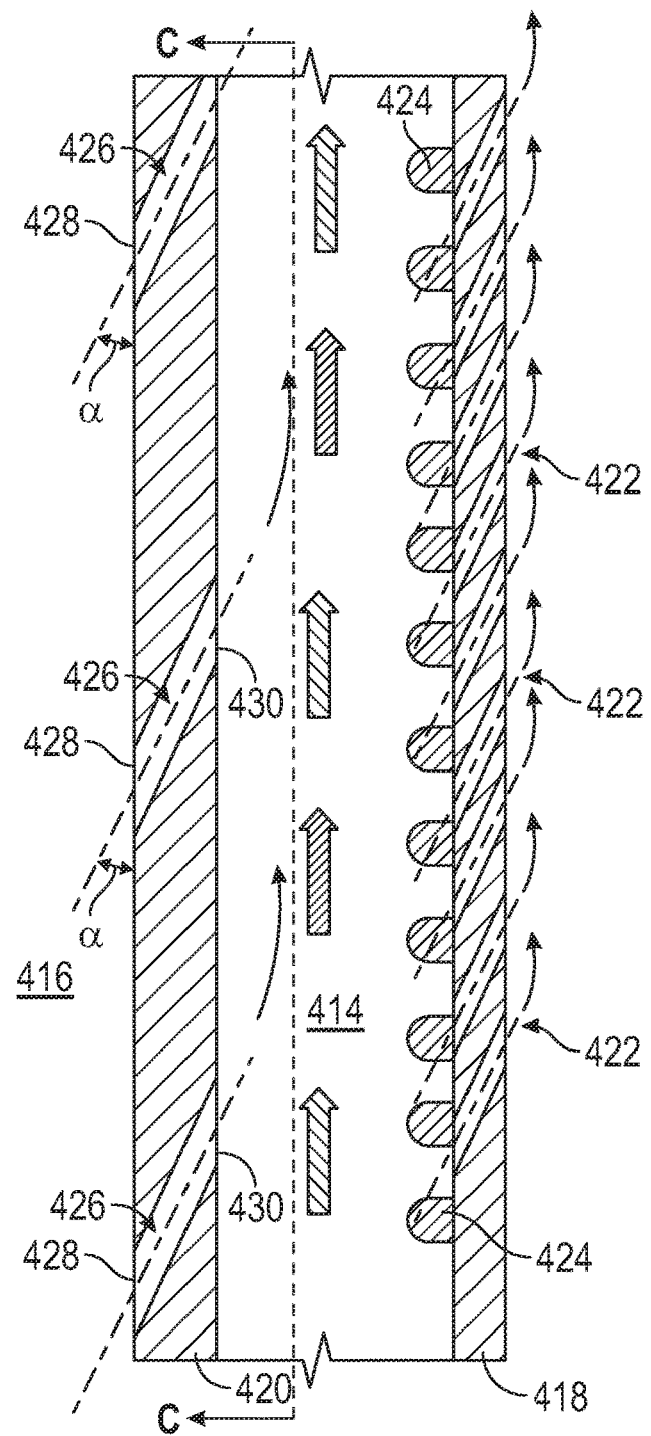
FIG. 4B is a cross-sectional illustration of the airfoil of FIG. 4A as viewed along the line B-B shown in FIG. 4A.

Turning to FIGS. 4A-4C, schematic illustrations of an airfoil 400 in accordance with an embodiment of the present disclosure are shown. The airfoil 400 includes a plurality of hybrid skin core cooling cavities 414 and interior cold core cavities 416. FIGS. 4B-4C illustrate cross-sectional views of one of the hybrid skin core cooling cavities 414, as indicated in FIG. 4A. The hybrid skin core cooling cavity 414 is defined between a hot wall 418 and a cold wall 420, with the cold wall 420 being a wall of one of the cold core cavities 416, as shown. The hybrid skin core cooling cavity 414 can be sub-divided or separated by one or more radially extending segmented ribs 432. The cold core cavities 416 can be fluidly connected to the hybrid skin core cooling cavities 414 by one or more hybrid skin core cooling cavity resupply holes 426. As shown in FIGS. 4B-4C, various cooling features are formed relative to the hybrid skin core cooling cavity 414, such as within the hot and cold walls 418, 420.

For example, with reference to FIG. 4B, the hot wall 418 includes a plurality of film cooling holes 422 which are arranged to direct air from within the hybrid skin core cooling cavity 414 into the gas path and to form a film of air on the exterior surface of the hot wall 418. Further, as shown, the hot wall 418 can include various heat transfer augmentation features 424, such as turbulators, trip strips, including, but not limited to: normal, skewed, segmented skewed, chevron, segmented chevron, W-shaped, discrete W's, pin fins, hemispherical bumps and/or dimples, as well as non-hemispherical shaped bumps and/or dimples, etc.

The hybrid skin core cooling cavity 414 is resupplied with cool air from the cold core cavity 416 through a plurality of hybrid skin core cooling cavity resupply holes 426. Each hybrid skin core cooling cavity resupply hole 426 extends from an inlet 428 to an outlet 430, with the inlet 428 being open to the cold core cavity 416 and the outlet 430 being open to the hybrid skin core cooling cavity 414. The hybrid skin core cooling cavity resupply holes 426 are angled relative to the cold wall 420 at an injection angle α. In some embodiments, the injection angle α may be 30° or less. The injection angle α may be selected to achieve low momentum mixing between the resupply air provided from the cold core cavity 416 and the air within the hybrid skin core cooling cavity 414. The injection angle α is an angle for injection of resupply air passing from the cold core cavity 416, through the hybrid skin core cooling cavity resupply hole 426, and into the hybrid skin core cooling cavity 414 such that the injected air is directed, at least partially, parallel to a direction of flow within the hybrid skin core cooling cavity 414.

FIG. 4C illustrates an elevation view of a portion of the hybrid skin core cooling cavity 414 having a plurality of radially extending segmented ribs 432. The radially extending segmented ribs 432 can divide the hybrid skin core cooling cavity 414 into a plurality of subcavities. In some embodiments, the radially extending segmented ribs 432 may be employed to partially separate two adjacent hybrid skin core cooling cavities, rather than subdividing a single hybrid skin core cooling cavity. As described herein, a first hybrid skin core cooling cavity 414a is shown adjacent a second hybrid skin core cooling cavity 414b (with the hybrid skin core cooling cavities 414a, 414b referring to either adjacent hybrid skin core cooling cavities or subcavities divided by the ribs 432). The segmented ribs 432 are divided by rib gaps 434. As shown, the hybrid skin core cooling cavity resupply hole 426 is located within the rib gap 434 between segments of a segmented rib 432.

As shown in FIG. 4C, the outlet 430 of the hybrid skin core cooling cavity resupply hole 426 has a geometric shape such that air flowing through the hybrid skin core cooling cavity resupply hole 426 will enter both the first and second hybrid skin core cooling cavities 414a, 414b. Further, as shown, the inlet 428 is shown with a smaller cross-sectional area than the outlet 430 (in this case the inlet 428 is circular and the outlet 430 is crescent shaped or cusped). As such, the cross-sectional area of the hybrid skin core cooling cavity resupply hole 426 increases from the inlet 428 to the outlet 430. The increase in cross-sectional area may be continuous or step-wise, and in some embodiments, only a portion of the hybrid skin core cooling cavity resupply hole may have an increasing cross-section area (e.g., a constant cross-sectional area for a length of the hybrid skin core cooling cavity resupply hole and a changing cross-sectional area for another length of the hybrid skin core cooling cavity resupply hole). In some embodiments, the inlet 428 may be elliptical with a long axis extending in a radial direction (e.g., in the direction of flow indicated in FIG. 4B). Further, as shown, and in some embodiments, the inlet and the outlet may have different geometric shapes.

The hybrid skin core cooling cavity resupply holes, and particularly the outlet thereof, may have various geometric shapes, orientations at the inlet, orientations at the outlet, and/or orientations/shapes for the length of the hybrid skin core cooling cavity resupply hole between the inlet and the outlet thereof. In some embodiments, the arrangement of the hybrid skin core cooling cavity resupply hole may be linear and/or curvilinear in shape. The hybrid skin core cooling cavity resupply holes may be either single or multi-lobed geometric shapes at the outlet, in order to promote local changes in the flow vortices which can alter and restart the thermal, momentum, and viscous boundary layers along a rib-roughened surface adjacent to the hot external airfoil wall. In some embodiments, the outlet of the hybrid skin core cooling cavity resupply hole may comprises two or more openings, with different resupply branches extending from a single inlet opening to multiple outlet openings.

The unique shapes of the hybrid skin core cooling cavity resupply holes and relative orientation to a cooling flow flowing through the hybrid skin core cooling cavity (e.g., upward direction arrows shown in FIG. 4B) may be dependent on various turbulator (e.g., trip strips) geometries incorporated within the hybrid skin core cooling cavities. For example, trip strip geometries including normal, skewed, segmented skewed, single chevron, segmented chevron, W-shaped, etc. may each require a unique geometric shape of the outlets of the hybrid skin core cooling cavity resupply holes in order to induce local vortices that can reinitialize near-wall thermal, momentum, and viscous boundary layers. Because the vortex structures produced by each of the trip strip geometry orientations are inherently different with the hybrid skin core cooling cavities, the flow vortex structures required to restart a thermal boundary layer while minimizing momentum mixing losses between injected resupply flow through the hybrid skin core cooling cavity resupply holes and the cooling flow within the hybrid skin core cooling cavity may need to consist of uniquely defined geometric single and/or multi-lobed geometric features, orientations, and injection angles.

Various embodiments provided herein are directed to identifying and defining unique geometries for hybrid skin core cooling cavity resupply holes that may be required in order to address adverse reductions in convective heat transfer augmentation resulting from fully developed flow, excessive pressure loss, and cooling air temperature heat pickup in high $L/D_h$ hybrid skin core cooling cavities. As such, the hybrid skin core cooling cavity resupply holes can operate as boundary layer restart resupply, wherein the cooling flow within the hybrid skin core cooling cavities can be resupplied and additional cool air and/or pressure can be injected into the hybrid skin core cooling cavity necessary to improve convective cooling characteristics and overall thermal performance of hybrid skin core cooling cavities.

Turning now to FIGS. 5-10, schematic illustrations of non-limiting examples of geometries of hybrid skin core cooling cavity resupply holes in accordance with the present disclosure are shown. In addition to illustrating the geometry of the hybrid skin core cooling cavity resupply holes, FIGS. 5-10 also illustrate an arrangement of heat transfer augmentation features for the respective airfoils, with the heat transfer augmentation features being located on a hot wall of the hybrid skin core cooling cavities. The hybrid skin core cooling cavity resupply holes shown in FIGS. 5-10 are formed passing through a cold wall of the hybrid skin core cooling cavities, similar to that shown and described above.

FIG. 5 illustrates a partial illustration of an airfoil 500 having a plurality of segmented ribs 532 separating two adjacent hybrid skin core cooling cavities 514a, 514b, with a plurality of heat transfer augmentation features 524 located on a hot wall of the hybrid skin core cooling cavities 514a, 514b. The airfoil 500 further includes a hybrid skin core cooling cavity resupply hole 526 located between two of the segmented ribs 532 (e.g., within a gap of two radially adjacent rib segments) and passing through a cold wall of the hybrid skin core cooling cavities 514a, 514b. The hybrid skin core cooling cavity resupply hole 526 includes a first resupply branch 536 and a second resupply branch 538. In this embodiment, a single inlet opening is arranged to supply cool air from a cold core cavity into the hybrid skin core cooling cavities 514a, 514b, with a portion of the air passing through the first resupply branch 536 into a first hybrid skin core cooling cavity 514a and a portion of the air passing through the second resupply branch 538 into a second hybrid skin core cooling cavity 514b. The openings of the resupply branches 536, 538 at the outlet of the hybrid skin core cooling cavity resupply hole 526 can have various geometric shapes to provide a desired injection of air into the hybrid skin core cooling cavities 514a, 514b. For example, in the illustration of FIG. 5, the openings of the resupply branches 536, 538 at the outlet may be elongated ovals or ellipses with the long axis extending substantially radially or parallel with a flow direction of air within the respective hybrid skin core cooling cavities 514a, 514b. In this illustration, the first and second resupply branches 536, 538 are lobed in shape. Lobed or multi-lobed branches may be curved or rounded, and in some embodiments, the lobe of a branch may transition into the geometric shape of the outlet of the respective lobe or branch.

FIG. 6 illustrates a partial illustration of an airfoil 600 having a plurality of segmented ribs 632 separating two adjacent hybrid skin core cooling cavities 614a, 614b, with a plurality of heat transfer augmentation features 624 located on a hot wall of the hybrid skin core cooling cavities 614a, 614b. The airfoil 600 further includes a hybrid skin core cooling cavity resupply hole 626 located between two of the segmented ribs 632 (e.g., within a gap of two radially adjacent rib segments) and passing through a cold wall of the hybrid skin core cooling cavities 614a, 614b. The hybrid skin core cooling cavity resupply hole 626 includes a first resupply branch 636 and a second resupply branch 638. Similar to the embodiment of FIG. 5, a single inlet opening is arranged to supply cool air from a cold core cavity into the hybrid skin core cooling cavities 614a, 614b, with a portion of the air passing through the first resupply branch 636 into a first hybrid skin core cooling cavity 614a and a portion of the air passing through the second resupply branch 638 into a second hybrid skin core cooling cavity 614b. The openings of the resupply branches 636, 638 at the outlet of the hybrid skin core cooling cavity resupply hole 626 can have various geometric shapes to provide a desired injection of air into the hybrid skin core cooling cavities 614a, 614b. For example, in the illustration of FIG. 6, the openings of the resupply branches 636, 638 at the outlet may be elongated curves. In this illustration, the first and second resupply branches 636, 638 are curved or arcuate in shape.

FIG. 7 illustrates a partial illustration of an airfoil 700 having a plurality of segmented ribs 732 separating two adjacent hybrid skin core cooling cavities 714a, 714b, with a plurality of heat transfer augmentation features 724 located on a hot wall of the hybrid skin core cooling cavities 714a, 714b. The airfoil 700 further includes a hybrid skin core cooling cavity resupply hole 726 located between two of the segmented ribs 732 (e.g., within a gap of two radially adjacent rib segments) and passing through a cold wall of the hybrid skin core cooling cavities 714a, 714b. The hybrid skin core cooling cavity resupply hole 726 includes a first resupply branch 736 and a second resupply branch 738. Similar to the embodiments described above, a single inlet opening is arranged to supply cool air from a cold core cavity into the hybrid skin core cooling cavities 714a, 714b, with a portion of the air passing through the first resupply branch 736 into a first hybrid skin core cooling cavity 714a and a portion of the air passing through the second resupply branch 738 into a second hybrid skin core cooling cavity 714b. The openings of the resupply branches 736, 738 at the outlet of the hybrid skin core cooling cavity resupply hole 726 are split-shape. In this illustration, the first and second resupply branches 736, 738 are curved or arcuate in shape. The split-shape openings of the resupply branches 736, 738 are arranged to align or mirror the shape or geometry of the heat transfer augmentation features 724, and thus can provide a specific injection of cool resupply air into the hybrid skin core cooling cavities 714a, 714b. The split-shape of the opening can encourage diffusion of the cool resupply flow into the hybrid skin core cooling cavities 714a, 714b to thus minimize vortices as the resupply air is injected into a flow stream within the hybrid skin core cooling cavities 714a, 714b.

FIG. 8 illustrates a partial illustration of an airfoil 800 having a plurality of segmented ribs 832 separating two adjacent hybrid skin core cooling cavities 814a, 814b, with a plurality of heat transfer augmentation features 824 located on a hot wall of the hybrid skin core cooling cavities 814a, 814b. The airfoil 800 further includes a hybrid skin core cooling cavity resupply hole 826 located between two of the segmented ribs 832 (e.g., within a gap of two radially adjacent rib segments) and passing through a cold wall of the hybrid skin core cooling cavities 814a, 814b. The hybrid skin core cooling cavity resupply hole 826 includes a first resupply branch 836 and a second resupply branch 838. Similar to the embodiments described above, a single inlet opening is arranged to supply cool air from a cold core cavity into the hybrid skin core cooling cavities 814a, 814b, with a portion of the air passing through the first resupply branch 836 into a first hybrid skin core cooling cavity 814a and a portion of the air passing through the second resupply branch 838 into a second hybrid skin core cooling cavity 814b. The openings of the resupply branches 836, 838 at the outlet of the hybrid skin core cooling cavity resupply hole 826 are split-shape, similar to the arrangement shown in FIG. 7. However, in this embodiment, the resupply branches 836, 838 include internal dividers 840, 842 arranged to split a flow within the resupply branches 836, 838. In this illustration, the first and second resupply branches 836, 838 are curved or arcuate in shape with the split-shaped (and divided) openings at the outlets thereof. Similar to the embodiment of FIG. 7, the split-shape openings of the resupply branches 836, 838 are arranged to align or mirror the shape or geometry of the heat transfer augmentation features 824, and thus can provide a specific injection of cool resupply air into the hybrid skin core cooling cavities 814a, 814b.

FIG. 9 illustrates a partial illustration of an airfoil 900 having a plurality of segmented ribs 932 separating two adjacent hybrid skin core cooling cavities 914a, 914b, with a plurality of heat transfer augmentation features 924 located on a hot wall of the hybrid skin core cooling cavities 914a, 914b. The airfoil 900 further includes a hybrid skin core cooling cavity resupply hole 926 located between two of the segmented ribs 932 (e.g., within a gap of two radially adjacent rib segments) and passing through a cold wall of the hybrid skin core cooling cavities 914a, 914b. The hybrid skin core cooling cavity resupply hole 926 includes a first resupply branch 936 and a second resupply branch 938. Similar to the embodiments described above, a single inlet opening is arranged to supply cool air from a cold core cavity into the hybrid skin core cooling cavities 914a, 914b. A portion of the air passing through the first resupply branch 936 into a first hybrid skin core cooling cavity 914a and a portion of the air passing through the second resupply branch 938 into a second hybrid skin core cooling cavity 914b. The openings of the resupply branches 936, 938 at the outlet of the hybrid skin core cooling cavity resupply hole 926 are streamwise diffuser-shaped. In this illustration, the first and second resupply branches 936, 938 are curved or arcuate in shape with the streamwise diffuser-shaped openings at the outlets thereof.

Figure 10:
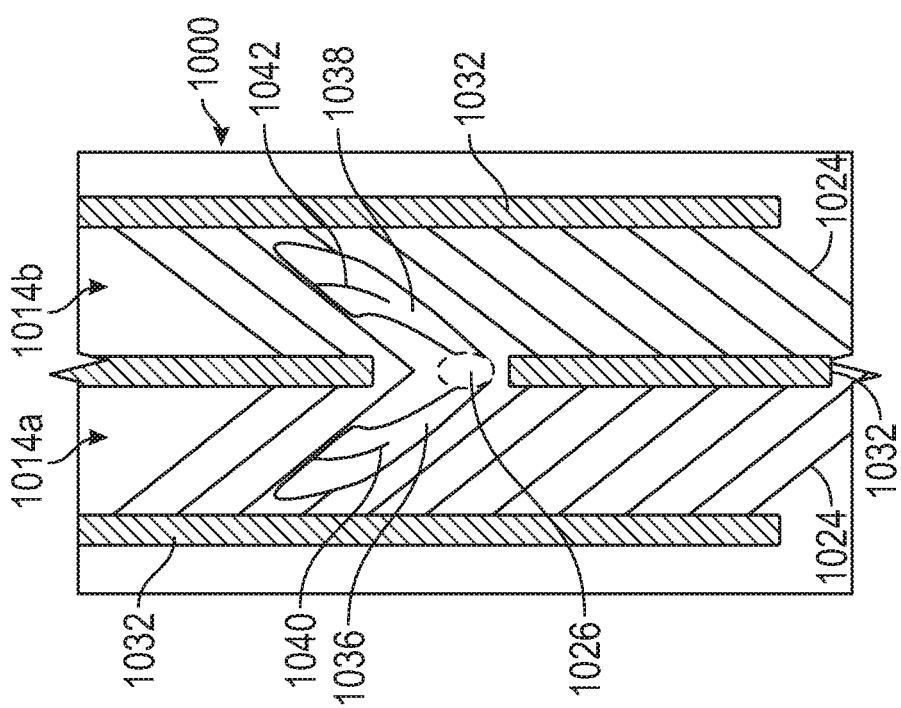
FIG. 10 is a schematic illustration of a hybrid skin core cooling cavity resupply hole geometry in accordance with an embodiment of the present disclosure.

FIG. 10 illustrates a partial illustration of an airfoil 1000 having a plurality of segmented ribs 1032 separating two adjacent hybrid skin core cooling cavities 1014a, 1014b, with a plurality of heat transfer augmentation features 1024 located on a hot wall of the hybrid skin core cooling cavities 1014a, 1014b. The airfoil 1000 further includes a hybrid skin core cooling cavity resupply hole 1026 located between two of the segmented ribs 1032 (e.g., within a gap of two radially adjacent rib segments) and passing through a cold wall of the hybrid skin core cooling cavities 1014a, 1014b. The hybrid skin core cooling cavity resupply hole 1026 includes a first resupply branch 1036 and a second resupply branch 1038. Similar to the embodiments described above, a single inlet opening is arranged to supply cool air from a cold core cavity into the hybrid skin core cooling cavities 1014a, 1014b. A portion of the air passing through the first resupply branch 1036 into a first hybrid skin core cooling cavity 1014a and a portion of the air passing through the second resupply branch 1038 into a second hybrid skin core cooling cavity 1014b. The openings of the resupply branches 1036, 1038 at the outlet of the hybrid skin core cooling cavity resupply hole 1026 are angled (e.g., parallel with a direction of the heat transfer augmentation features 1024) and include internal dividers 1040, 1042 arranged to split a flow within the resupply branches 1036, 1038. In this illustration, the first and second resupply branches 1036, 1038 are curved or arcuate in shape with the angled (and divided) openings at the outlets thereof.

The above described embodiments are shown with segmented ribs dividing two adjacent hybrid skin core cooling cavities and the hybrid skin core cooling cavity resupply holes are positioned at locations in gaps of the segmented ribs. However, the present disclosure is not so limited. For example, in some embodiments, the hybrid skin core cooling cavity resupply hole can be located on a cold wall of a single hybrid skin core cooling cavity.

Figure 11:
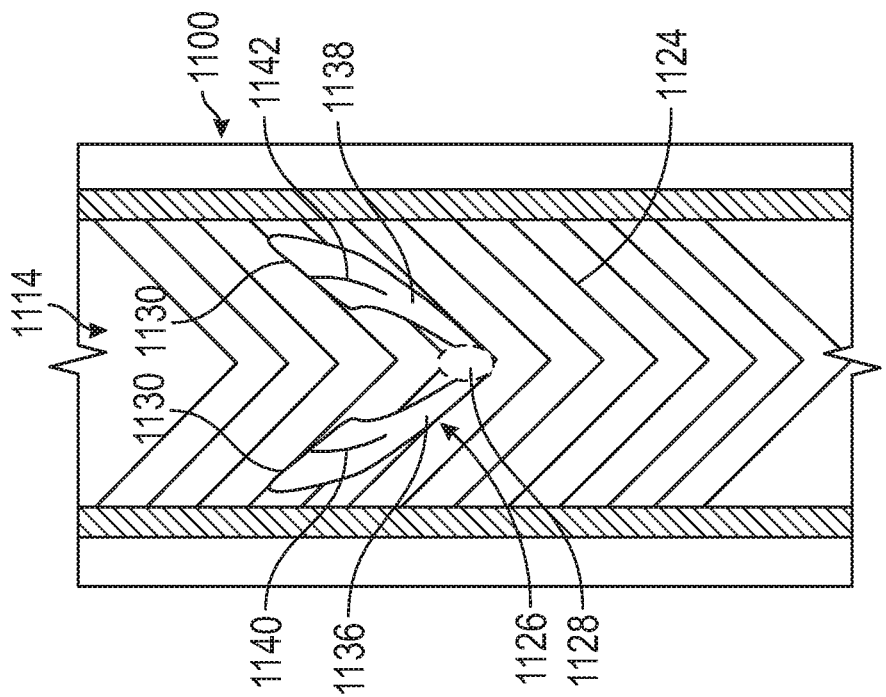
FIG. 11 is a schematic illustration of a hybrid skin core cooling cavity resupply hole geometry in accordance with an embodiment of the present disclosure.

Turning now to FIG. 11, one such example arrangement of an airfoil 1100 having a hybrid skin core cooling cavity resupply hole 1126 positioned in the center area of a hybrid skin core cooling cavity 1114. As shown, an inlet 1128 is formed in a cold wall of the hybrid skin core cooling cavity 1114 with resupply branches 1136, 1138 extending through the cold wall to an outlet 1130, thus defining the hybrid skin core cooling cavity resupply hole 1126. The outlet 1130 is formed in two parts, with openings at the ends of the respective resupply branches 1136, 1138. Each of the openings of the outlet 1130 include internal dividers 1140, 1142 The openings of the outlet 1130 are angled to align with the geometry of heat transfer augmentation features 1124 that are located on a hot wall of the hybrid skin core cooling cavity 1114.

Although described herein with respect to an airfoil, those of skill in the art will appreciate that embodiments provided herein can be applied to various double-walled cooling passages. For example, embodiments provided herein can be applied to blades, vanes, blade outer air seals, combustor hot section components, etc. without departing from the scope of the present disclosure. Advantageously, design concepts for such components that incorporate long $L/D_h$ hybrid micro channel cooling cavities can implement boundary layer restart resupply geometry features, as described herein, to mitigate design challenges associated with large pressure loss, extreme cooling air temperature heat pickup, and reduction in heat transfer augmentation due to long $L/D_h$ fully developed flow fields.

The geometry and shapes of the hybrid skin core cooling cavity resupply holes disclosed herein can be formed, in some embodiments, directly using metal powder base fusion additive manufacturing processes. In some embodiments, the hybrid skin core cooling cavity resupply holes can be created by using additive manufacturing processes (e.g., fabricated ceramic alumina or silica cores) from which conventional lost wax investment casting processes may be used to create single crystal blade, vane, blade outer air seal, combustor panel, etc. cooling design configuration. Further, in some embodiments, the hybrid skin core cooling cavity resupply holes can be created using fugitive core manufacturing fabrication processes.

Although the various above embodiments are shown as separate illustrations, those of skill in the art will appreciate that the various features can be combined, mix, and matched to form an airfoil having a desired cooling scheme that is enabled by one or more features described herein. Thus, the above described embodiments are not intended to be distinct arrangements and structures of airfoils and/or core structures, but rather are provided as separate embodiments for clarity and ease of explanation.

Advantageously, embodiments provided herein are directed to airfoil cooling cavities having improved cooling features. Further, advantageously, improved part life, improved cooling, and reduced weight can all be achieved from embodiments of the present disclosure.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, the component comprising:
a hybrid skin core cooling cavity defined by a cold wall and a hot wall, wherein the hot wall is exposed to an exterior environment of the component; and
a hybrid skin core cooling cavity resupply hole formed in the cold wall and fluidly connecting a cold core cavity and the hybrid skin core cooling cavity,
wherein the hybrid skin core cooling cavity resupply hole extends between an inlet on a side of the cold wall exposed to the cold core cavity and an outlet on a side of the cold wall exposed to the hybrid skin core cooling cavity,
wherein the hybrid skin core cooling cavity resupply hole is angled relative to the cold wall at an injection angle such that air passing through the hybrid skin core cooling cavity resupply hole is injected into the hybrid skin core cooling cavity at the injection angle and at least partially parallel to a direction of flow within the hybrid skin core cooling cavity, and a segmented rib within the hybrid skin core cooling cavity, wherein a gap is formed between segments of the segmented rib and wherein at least one of the inlet and the outlet are at least partially positioned within the gap between two segments of the segmented rib.

2. The component of claim 1, wherein the hot wall is an exterior wall of an airfoil and the cold wall is an interior wall of the airfoil.

3. The component of claim 1, wherein the outlet of the hybrid skin core cooling cavity resupply hole has a geometric shape that is different from the inlet.

4. The component of claim 1, wherein a cross-sectional area of the hybrid skin core cooling cavity resupply hole increases from the inlet to the outlet.

5. The component of claim 1, wherein the segmented rib divides the hybrid skin core cooling cavity into a first subcavity and a second subcavity.

6. The component of claim 1, wherein the outlet of the hybrid skin core cooling cavity resupply hole is arranged to supply resupply air into both the first subcavity and the second subcavity.

7. The component of claim 1, wherein the outlet has at least one of a crescent, a curved, and a cusped shape.

8. The component of claim 1, wherein the hybrid skin core cooling cavity resupply hole is a multi-lobed hybrid skin core cooling cavity resupply hole.

9. The component of claim 8, wherein the multi-lobed hybrid skin core cooling cavity resupply hole comprises a first resupply branch and a second resupply branch, wherein each of the first resupply branch and the second resupply branch are fluidly connected to the inlet and have separate openings at the outlet.

10. The component of claim 8, wherein at least one lobe of the multi-lobed hybrid skin core cooling cavity resupply hole comprises an internal divider proximate the outlet.

11. The component of claim 1, wherein the outlet of the hybrid skin core cooling cavity resupply hole is streamwise diffuser-shaped.

12. The component of claim 1, wherein the hybrid skin core cooling cavity includes a plurality of heat transfer augmentation features.

13. The component of claim 12, wherein the plurality of heat transfer augmentation features are formed on the hot wall of the hybrid skin core cooling cavity.

14. The component of claim 12, wherein the outlet of the hybrid skin core cooling cavity resupply hole is shaped to align with a shape of the heat transfer augmentation features.

15. The component of claim 1, wherein the injection angle is 30° or less.

16. A gas turbine engine comprising:
a component having a hybrid skin core cooling cavity defined by a cold wall and a hot wall, wherein the hot wall is exposed to an exterior environment of the component and a hybrid skin core cooling cavity resupply hole formed in the cold wall and fluidly connecting a cold core cavity and the hybrid skin core cooling cavity,
wherein the hybrid skin core cooling cavity resupply hole extends between an inlet on a side of the cold wall exposed to the cold core cavity and an outlet on a side of the cold wall exposed to the hybrid skin core cooling cavity,
wherein the hybrid skin core cooling cavity resupply hole is angled relative to the cold wall at an injection angle such that air passing through the hybrid skin core cooling cavity resupply hole is injected into the hybrid skin core cooling cavity at the injection angle and at least partially parallel to a direction of flow within the hybrid skin core cooling cavity, and a segmented rib within the hybrid skin core cooling cavity, wherein a gap is formed between segments of the segmented rib and wherein at least one of the inlet and the outlet are at least partially positioned within the gap between two segments of the segmented rib.

17. The gas turbine engine of claim 16, wherein the component is one of a blade, a vane, a blade outer air seal, or a combustor panel.

18. The gas turbine engine of claim 16, wherein:
the hot wall is an exterior wall of an airfoil,
the cold wall is an interior wall of the airfoil, and
the exterior environment is a gas path of the gas turbine engine.

* * * * *